United States Patent
Yagi

(10) Patent No.: US 8,050,548 B2
(45) Date of Patent: Nov. 1, 2011

(54) CONTROL APPARATUS, IMAGING APPARATUS, AND CONTROL METHOD FOR THE IMAGING APPARATUS

(75) Inventor: Hisao Yagi, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/689,202

(22) Filed: Jan. 18, 2010

(65) Prior Publication Data

US 2010/0183287 A1 Jul. 22, 2010

(30) Foreign Application Priority Data

Jan. 20, 2009 (JP) ................................. 2009-009976

(51) Int. Cl.
*G03B 17/00* (2006.01)
*G03B 15/14* (2006.01)
*H04N 5/228* (2006.01)

(52) U.S. Cl. .............. 396/52; 396/48; 396/86; 396/133; 348/208.2; 348/208.15; 359/696

(58) Field of Classification Search .................. 396/52, 396/48, 86, 93, 133; 348/207.99, 208.2, 348/208.12; 359/696, 824
See application file for complete search history.

(56) References Cited

U.S. PATENT DOCUMENTS

2001/0048423 A1 12/2001 Rekimoto

FOREIGN PATENT DOCUMENTS

| JP | 9-061869 | 3/1997 |
|----|----------|--------|
| JP | 10-049290 | 2/1998 |
| JP | 4009887 | 4/2000 |

*Primary Examiner* — Rochelle-Ann J Blackman

(74) *Attorney, Agent, or Firm* — Canon USA Inc. IP Division

(57) ABSTRACT

In a mode in which a lens barrel need not be extended, if it is determined that a vibration is larger than a reference value, the lens barrel is driven so as to be retracted to a predetermined position.

7 Claims, 8 Drawing Sheets

CONTROL APPARATUS, IMAGING APPARATUS, AND CONTROL METHOD FOR THE IMAGING APPARATUS

BACKGROUND OF THE INVENTION

1. Field of the Invention

The present invention relates to a control apparatus, an imaging apparatus, and a control method for the imaging apparatus, and more particularly to technology for detecting an instruction to the imaging apparatus using a vibration applied to the imaging apparatus.

2. Description of the Related Art

In recent years, downsizing has been advancing in portable information processing apparatuses, such as personal digital assistants (PDA) and digital cameras, to improve user-friendliness, including better portability.

On the other hand, progress has been made in sensor technology used to detect vibration applied to an apparatus. The vibration or an amount of a swing applied to an apparatus, for example, can be detected by an acceleration sensor or a gyro sensor. In Japanese Patent No. 4009887 and Japanese Patent Application Laid-Open No. 10-049290, it is discussed that a swinging operation of an apparatus or a change in the position of the apparatus is detected by using the sensors, and an operation instruction to the apparatus is given according to a detection result.

Further, Japanese Patent Application Laid-Open No. 09-061869 discusses a camera structure configured to protect the lens barrel by retracting the lens barrel into the camera main body when vibration is given thereto that is relatively larger than a hand-shake of a camera. However, if a predetermined operation is performed when an amount of a swing is detected by an apparatus, an amount of vibration is larger than an amount of a camera shake. Therefore, if a threshold value of determination is set at a similar value to that of a camera shake, the lens barrel tends to retract easily. In other words, even when vibration applied to the camera is not so large, the lens barrel retracts easily, and if this retraction happens during image capturing, the user needs to operate a switch to extend the lens barrel.

In a structure in which the imaging apparatus is operated according to an amount of a swing that occurs when a user swings the apparatus or according to an amount of displacement when the user changes the position of the apparatus, it is necessary to protect the lens barrel.

More specifically, when the lens barrel is extended forwards from the apparatus main body, it is desirable to protect the lens barrel from being broken by mistake. The lens barrel should preferably be protected by retracting it during a reproduction display operation when image capturing is not performed. However, if the lens barrel is retracted during shooting, an image capturing action cannot be started immediately.

SUMMARY OF THE INVENTION

According to an aspect of the present invention, a control apparatus includes a vibration detection unit configured to detect vibration of an apparatus, a controller configured to perform a predetermined process corresponding to an operation instruction from a user based on a detection signal obtained by the vibration detection unit, and a driver configured to control drive of a lens barrel according to a control instruction from the controller, wherein the controller controls the driver to cause the lens barrel to be withdrawn to a predetermined position when receiving the operation instruction in a mode in which the lens barrel need not be extended.

According to another aspect of the present invention, a control apparatus includes a vibration detection unit configured to detect vibration of an apparatus, and a controller configured to perform a predetermined process corresponding to an operation instruction from a user based on a detection signal obtained by the vibration detection unit, wherein the controller does not receive the operation instruction if the lens barrel is not retracted in a main body of the apparatus.

According to the present invention, the lens barrel can be protected appropriately according to a specified mode when the imaging apparatus is operated by shaking or swinging the apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
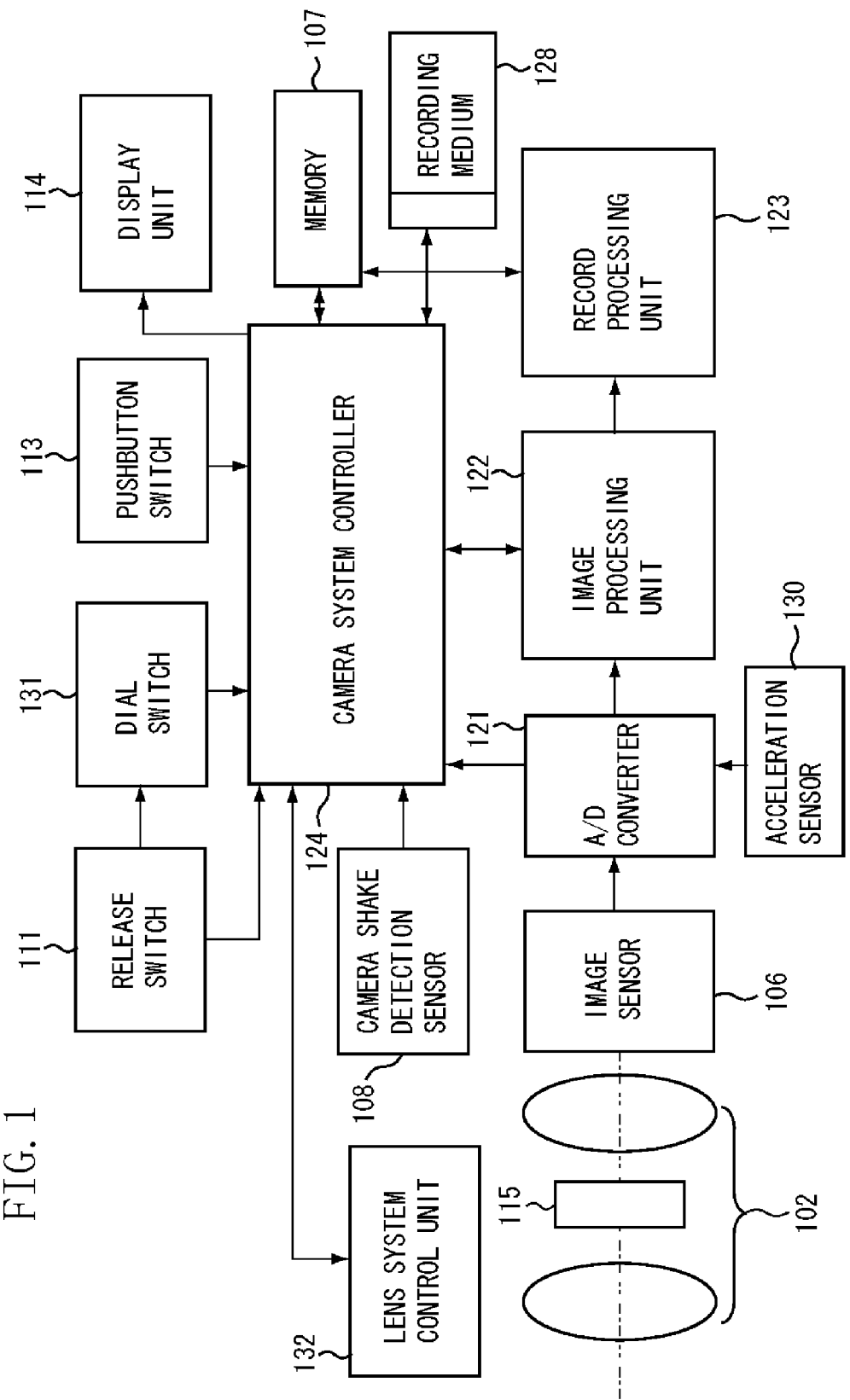
FIG. 1 is a block diagram illustrating a system structure of an imaging apparatus according to an exemplary embodiment of the present invention.
Figure 2:
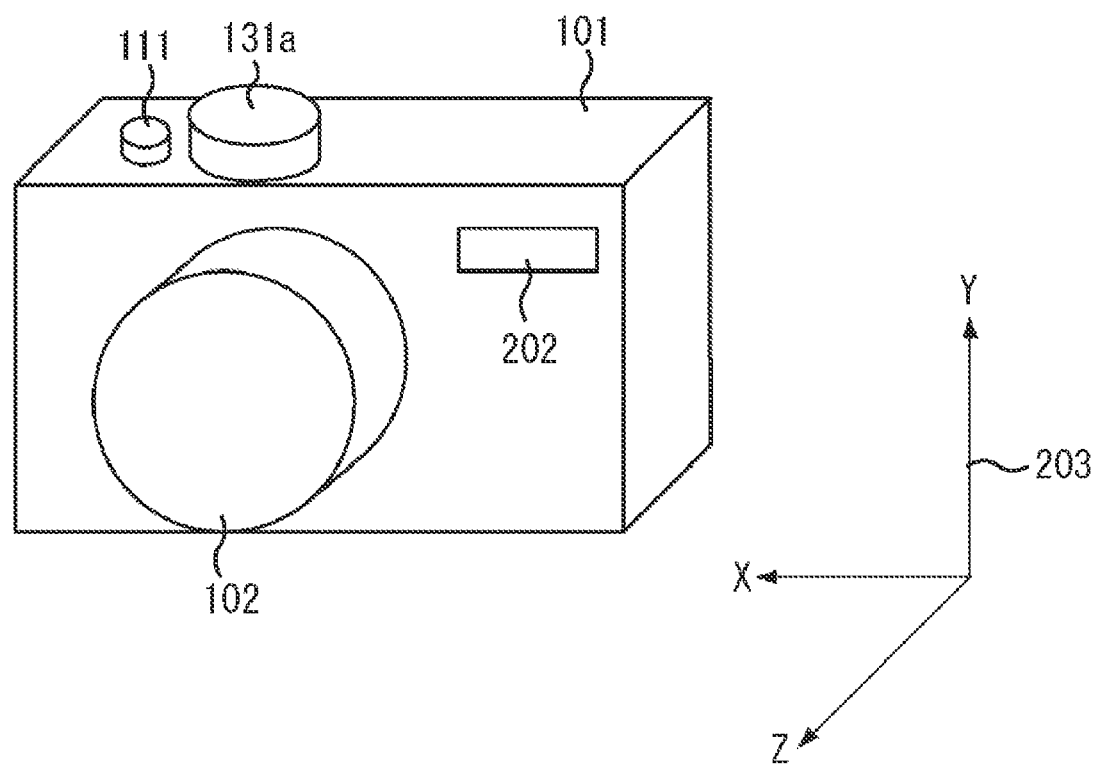
FIG. 2 is a schematic perspective view, seen diagonally from the front of the imaging apparatus according to an exemplary embodiment of the present invention.
Figure 3:
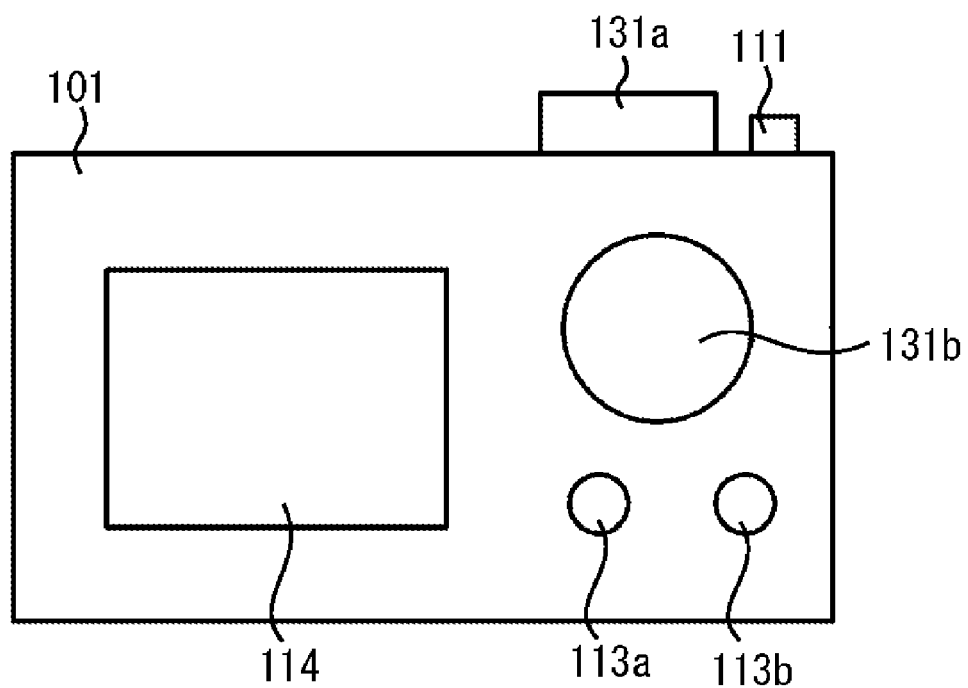
FIG. 3 is a schematic rear view of the imaging apparatus according to an exemplary embodiment of the present invention.

FIGS. 1 to 3 illustrate an example of an imaging apparatus according to an exemplary embodiment of the present invention. FIG. 1 is a block diagram illustrating an example system structure of the imaging apparatus. FIG. 2 is a schematic diagonal perspective view of the imaging apparatus, in which three-dimensional orthogonal axes (X-axis, Y-axis, Z-axis) indicate the directions of detection axes of an acceleration sensor to be described later. FIG. 3 is a schematic rear view of the imaging apparatus.

An imaging apparatus 101, such as a digital camera, includes a lens barrel 102 in the main body, and the lens barrel includes optical lenses, such as a zoom lens, focus lens, and a camera-shake correction lens. The lens barrel further includes a diaphragm and a neutral density filter, which form an exposure control unit 115. A lens system control unit 132 controls the lenses in the lens barrel 102, and the exposure control unit 115.

The lens system control unit 132 appropriately controls a zoom position and a focus position, and performs adequate exposure control. According to a control signal from the camera system controller 124, which will be described later, the lens system control unit 132 controls the drive of the lens barrel 102 to move the lens barrel 102 to its extended position from or its retracted position into the imaging apparatus main body.

An image sensor 106 forms an image capturing device, which captures an object image transmitted through the lens barrel 102. The image sensor 106 converts a photographed object image into an electrical signal, which is sent to an analog-digital (A-D) converter 121 and converted into a digital signal. Image data that is converted into a digital signal is sent to an image processing unit 122, which is described later.

A memory 107 stores image data, a control program, and various kinds of information. The memory 107 includes a non-volatile memory device in which data is not lost even when power supply is cut off and a volatile memory device in which data is lost when power supply is cut off.

A camera-shake detection sensor 108 of the imaging apparatus is formed with a gyro sensor to detect shake of a camera using an imaging apparatus, and a detection signal is sent to the camera system controller 124.

A release switch 111 is an operation device used to instruct the apparatus to start image capturing, and a signal of operation instruction is sent to the camera system controller 124, which will be described later. More specifically, with regard to a pressing stroke of the release switch 111, when the release switch 111 is half pressed, an instruction for preparing image capturing is issued, and when the release switch 111 is full pressed, an instruction for starting to capture an image is issued.

During shooting, light from an object is focused on an image forming surface of the image sensor 106 via the lens barrel 102. An amount of exposure is adjusted based on a control amount by the exposure control unit 115, and an amount of light received by the image sensor 106, to expose the image sensor 106 to an appropriate amount of light from the object.

The image processing unit 122 processes a signal received from the image sensor 106 via the A-D converter 121, that is, an image signal corresponding to a number of pixels of the image sensor 106. The image processing unit 122 includes a white balance circuit, a gamma correction circuit, and an interpolation arithmetic circuit configured to obtain high resolution by interpolation calculation.

A record processing unit 123 outputs image file data to the memory 107, and generates image data to be output to the display unit 114 and stores the image data. The record processing unit 123 compresses still images and moving images by using a well-known method, and records compressed data in a recording medium 128.

The camera system controller 124, which is configured by using a central arithmetic processing unit (CPU), controls the entire system according to a program stored in the memory 107. The camera system controller 124 detects operations of a pushbutton switch 113 and a dial switch 131, and controls the relevant units according to detection results. The camera system controller 124 detects operations to the release button 111, generates an image-capturing timing signal, and outputs the timing signals to each unit when necessary.

In FIG. 1, the pushbutton switch 113 for displaying menus and select items is illustrated as a single block, a plurality of pushbutton switches may be provided for corresponding functions as exemplified by pushbutton switches 113a and 113b illustrated in FIG. 3. When pushbutton switches with different functions are provided, a pushbutton switch 113a may be assigned a function to display a menu, and a pushbutton switch 113b may be assigned a function to determine an item that is selected in a menu.

The dial switch 131 is used by the user as a switch to select a mode by rotating the switch. Though the dial switch 131 is illustrated as a single switch in FIG. 1, a plurality of dial switches may be provided for different functions as indicated by numerals 131a and 131b in FIG. 3. For example, a dial switch 131a on the top surface of the apparatus may be assigned a function to select basic modes, such as a photographing mode and a reproduction mode, and a dial switch 131b on the rear side of the apparatus may be assigned a function to select from various items on the menu.

A display unit 114 (FIG. 3) that is provided on the rear side of the imaging apparatus 101 displays photographed images and menu information, and also serves as an electronic view finder that displays object images successively.

A flash light 202 for illuminating an object in a dark environment during image-capturing (see FIG. 2) is provided on the front face of the imaging apparatus 101. An acceleration sensor 130 (vibration detection unit) is used to detect vibration applied to the apparatus. In the imaging apparatus 101, the sensor 130 detects acceleration in three-dimensional vibrations in the X-axis, Y-axis and Z-axis directions indicated by 203 (see FIG. 2). As a detection method of three-dimensional acceleration, a well-known technology can be used, such as a detection method by electrostatic capacitance and a detection method by resistance change.

For a detection method in an application of the present invention, any detection method can be adopted. The acceleration sensor 130 outputs an analog-value signal representing levels of acceleration in the X-axis, Y-axis, and Z-axis. Generally, a larger analog signal is output as acceleration becomes larger. Analog output of the acceleration sensor 130 is sent to the A-D converter 121, converted into a digital signal, and then input to the camera system controller 124.

To remove noise from analog output, it is preferable to provide a noise filter circuit in the former stage of the A-D converter 121. This noise filter circuit can be formed by a well-known filter circuit such as a high-pass filter (HPF) or a low-pass filter (LPF). As a noise removal method, filtering may be accomplished with a software filter in a program executed in the camera system controller 124.

In place of the acceleration sensor 130, a gyro sensor may be used for detection of vibration. When a gyro sensor is used, angular speed can be detected. By converting a detected angular speed into acceleration, the gyro sensor can be used similarly as the acceleration sensor.

If the imaging apparatus 101 is configured to detect vibration by the acceleration sensor 130, an acceleration sensor is preferably mounted on a substrate or a casing where vibration is likely to be transmitted.

Figure 4:
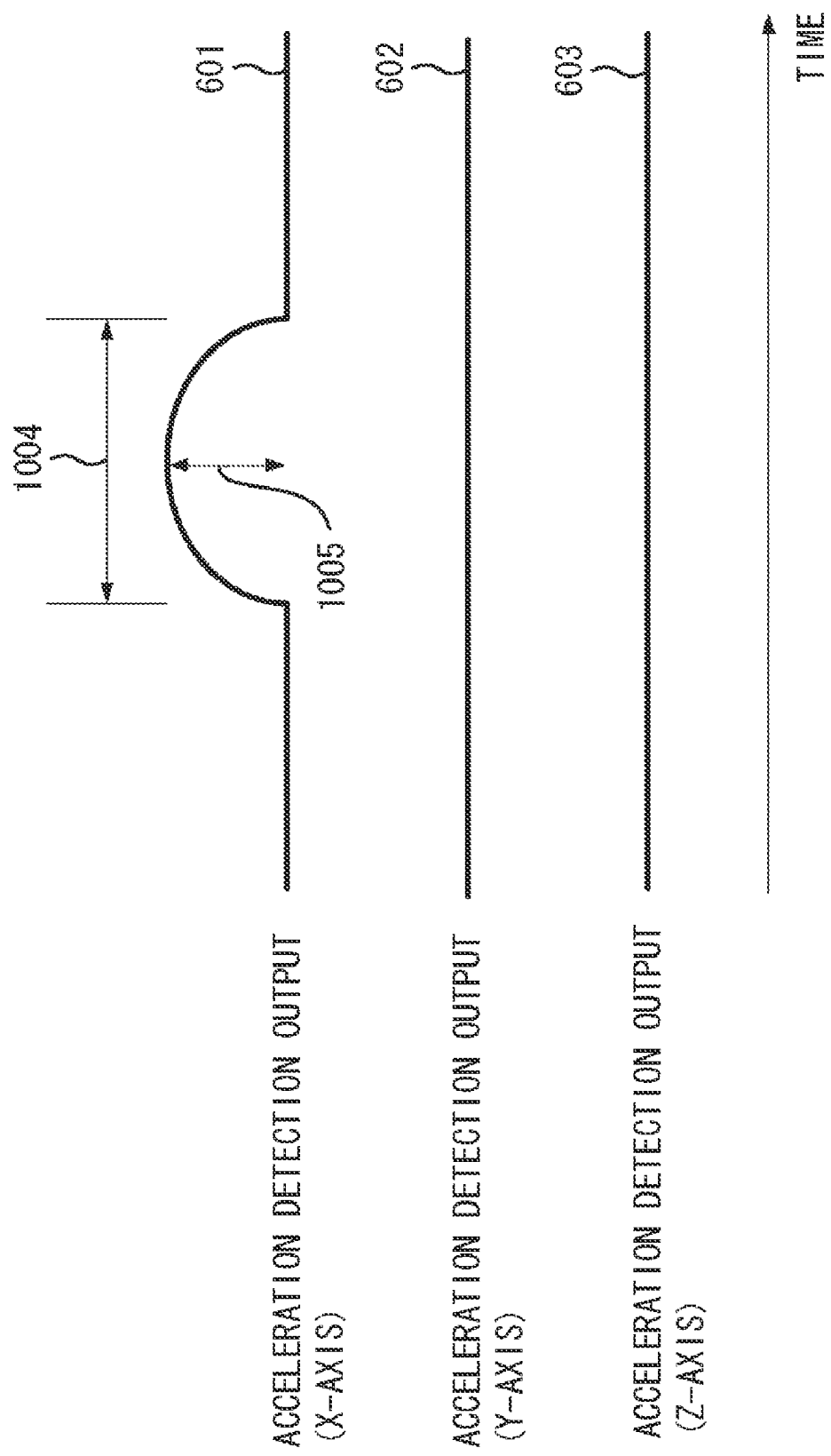
FIG. 4 illustrates detected waveforms output from an acceleration sensor.

FIG. 4 is a schematic diagram illustrating output waveforms from the acceleration sensor 130 when vibration is applied in the X-axis direction of the imaging apparatus 101. An output waveform 601 is obtained when acceleration in the X-axis direction is detected. An output waveform 602 is obtained when acceleration in the Y-axis direction is detected. An output waveform 603 is obtained when acceleration in the Z-axis direction is detected.

When vibration is applied in the X-axis direction of the imaging apparatus 101, on an output waveform 601 along the X-axis, a signal with an amplitude 1005 representing strength of the vibration is output in a period 1004 in which vibration is applied. On the other hand, no changes occur both on an output waveform 602 along the Y-axis and on an output waveform 603 along the Z-axis.

Under control of the camera system controller 124, data representing a detection result of acceleration is processed after the data is digitized by the A-D converter 121 for each of the axes of three-dimensional space, how much vibration is applied to the respective axes can be obtained. In other words, the position and the level of vibration can be determined.

The camera system controller 124 determines whether the vibration is larger than a reference value based on a detection signal of the vibration applied to the apparatus. This detection is made to prevent vibration due to a camera shake from being recognized by mistake as an operation instruction from the user.

As a result, if it is determined that the vibration is larger than a reference value and that the vibration is caused by the user's intentional swing. Therefore, the determination result is taken as an operation instruction, and a predetermined processing is performed accordingly.

A method for using an intentional vibration applied by the user to the apparatus as an operation instruction is described with reference to FIG. 5.

Figure 5:
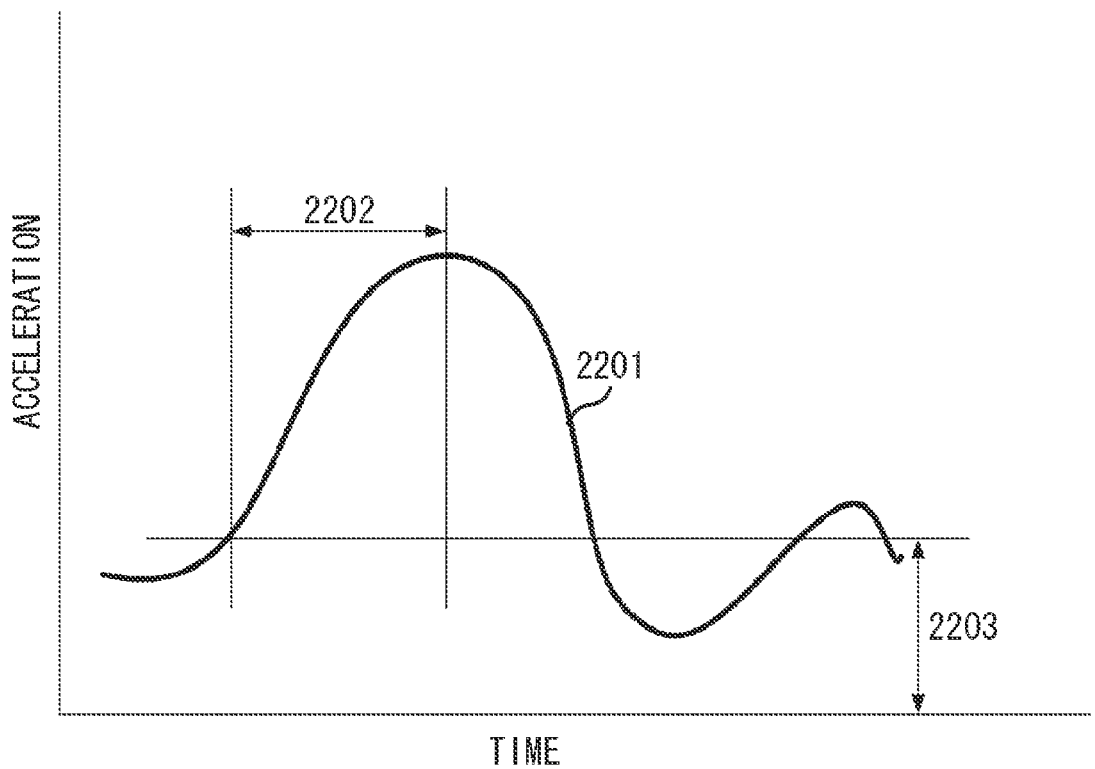
FIG. 5 illustrates detection of a swing operation by the acceleration sensor.

With regard to the above-described acceleration sensor 130, FIG. 5 schematically illustrates an example of a waveform that is generated when the user swung the apparatus in one axial direction. A graph 2201 shows changes in acceleration when the imaging apparatus is swung to issue an operation instruction.

Instead of using an operation switch, when the user gives an instruction by making an intentional swing, the acceleration sensor 130 initially detects a vibration larger than a predetermined level 2203 indicated by arrow. The level 2203 indicated by an arrow represents a reference value for determination, by which it is determined whether the vibration is large.

When the user deliberately swings the imaging apparatus with an intention to give an instruction to the apparatus (hereafter this swing is referred to as a swing operation), there is a high probability that acceleration is detected that is larger than the level 2203. However, the acceleration sensor 130 will detect even a vibration that is generated when the user picks up the imaging apparatus 101.

In this case, the vibration that is generated is only a small vibration, which is smaller than the vibration in a swing operation described above. An arrangement needs to be made to prevent such a vibration from being detected as a swing operation. It is desirable that an arrangement is made that vibration smaller than a predetermined level should be neglected to preclude adverse effects on a determination result.

The camera system controller 124 compares a detected acceleration with the predetermined level 2203, and if acceleration larger than or equal to a predetermined level 2203, and measures a time period when the acceleration is higher than a predetermined level. A time period 2202 indicated by an arrow represents a period of time from when the acceleration exceeds the predetermined level 2203 until when the acceleration reaches a peak value.

The camera system controller 124 measures a length of the period. When the length of the period 2202 indicated by an arrow is within a predetermined range, the camera system controller 124 determines that the user performed a swing operation to the apparatus. As a result, a processing allocated to the swing, a User Interface (UI) processing, for example, is performed.

A reference time period is used to determine whether a swing operation has been made based on a continuous period 2202 indicated by an arrow, that is, based on a length of time when the vibration continues to be larger than a predetermined level. For the reference time period, an allowable range can be set by studying time in which a human being can perform a swing operation.

If a time period 2202 is extremely short or long, there is a possibility that the vibration applied to the apparatus is not a vibration caused by an operation by a user. Therefore, in this case, an erroneous determination about a swing operation should preferably be prevented.

Retraction and extension of the lens barrel 102 is described referring to FIG. 6.

Figure 6A:
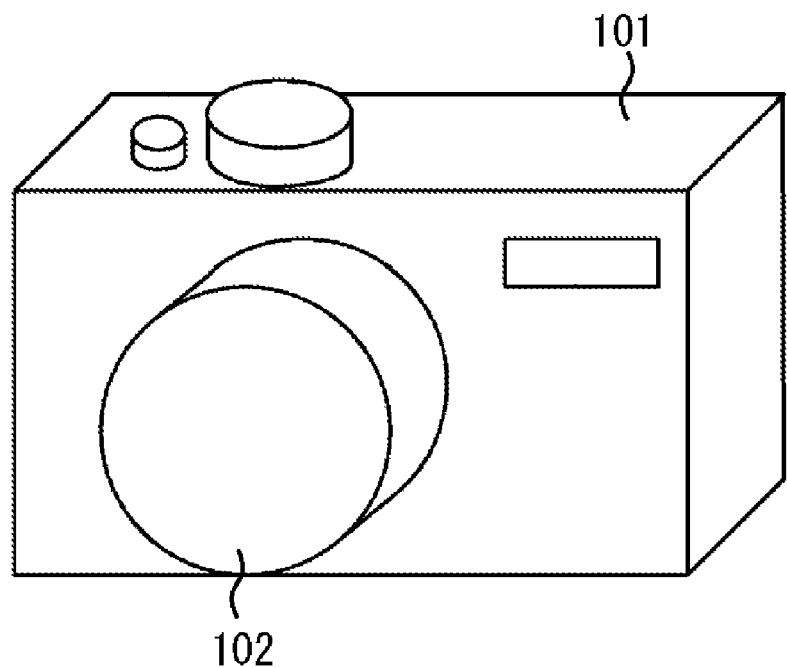
FIG. 6 illustrates extended and retracted states of the lens barrel.
Figure 6B:
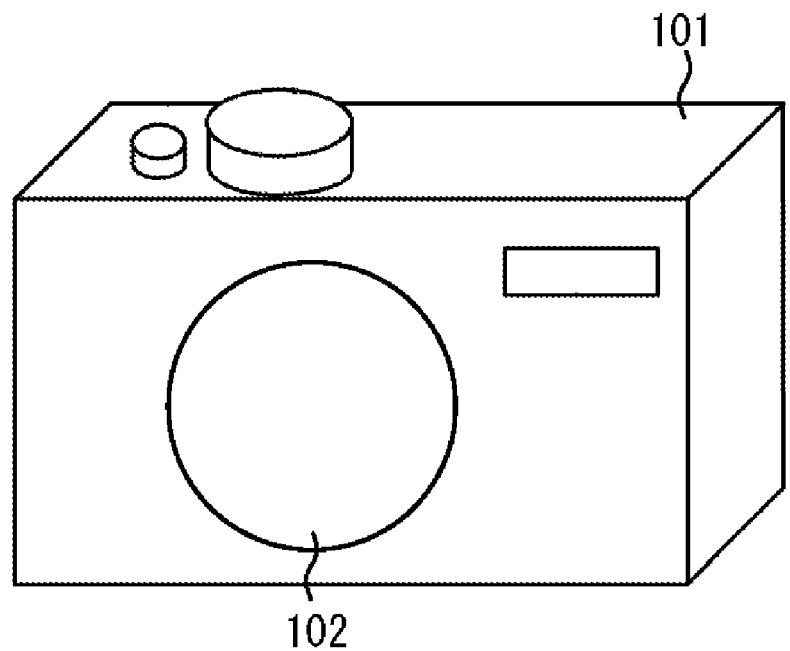

FIG. 6A schematically illustrates an extended state and FIG. 6B illustrates a retracted state of the lens barrel 102. When in retracted state (FIG. 6B), since the lens barrel 102 is collapsed into the imaging apparatus 101, the lens barrel is prevented from being inadvertently broken by the user. When power supply is cut off, the lens barrel 102 is pulled back into the imaging apparatus 101.

When the imaging apparatus 101 is started in the photographing mode from the power-off state, the lens barrel extends from the main body of the imaging apparatus 101 to an appropriate position as illustrated in FIG. 6A.

The extending and the retracting motions are performed by the lens system control unit 132 under control of the camera system controller 124. When the photographing mode is switched to the reproduction mode, the apparatus enters the reproduction mode under the condition that the lens barrel is extended.

The reason why the imaging apparatus 101 is switched to the reproduction mode after the lens barrel is extended is because the user may likely want to check a photographed image temporarily when the mode is switched from photographing mode to reproduction mode. In this case, it is necessary to immediately return to the photographing mode and get ready for next image capturing. When power supply is cut off, the lens barrel 102 retracts.

When the imaging apparatus 101 is started in the reproduction mode from the power-off state, in which the lens barrel 102 is retracted, the imaging apparatus enters the reproduction mode with the lens barrel at its retracted position. This is because an image may be possibly reproduced without capturing an image. When the reproduction mode is switched to the photographing mode, the lens barrel 102 extends from the main body of the imaging apparatus 101 to its appropriate position for imaging. If power supply is turned off at the moment, the lens barrel 102 is retracted.

As described above, the lens barrel 102 varies in its extending or retracting state according to the mode (photographing mode or reproduction mode). Processing in the imaging apparatus 101 is preferably switched according to the mode of the imaging apparatus 101 to prevent the lens barrel 102 from being broken during a swing operation.

The lens barrel 102 need not be used in the reproduction mode, for example. In other words, because the lens barrel 102 need not be used in the reproduction mode, when the imaging apparatus 101 receives a swing operation, the lens barrel 102 is retracted to prevent the lens barrel 102 from being damaged. In the photographing mode, because the lens barrel 102 cannot be retracted, if the imaging apparatus 101 recognizes a swing operation, the camera system controller 124 issues a warning and does not accept a swing operation from the user.

By issuing a warning and not accepting a swing operation, the user can be prevented from doing an unnecessary swing operation. In this manner, such an accident is prevented that the lens barrel 102 is damaged when the user swings the imaging apparatus 101.

Figure 7:
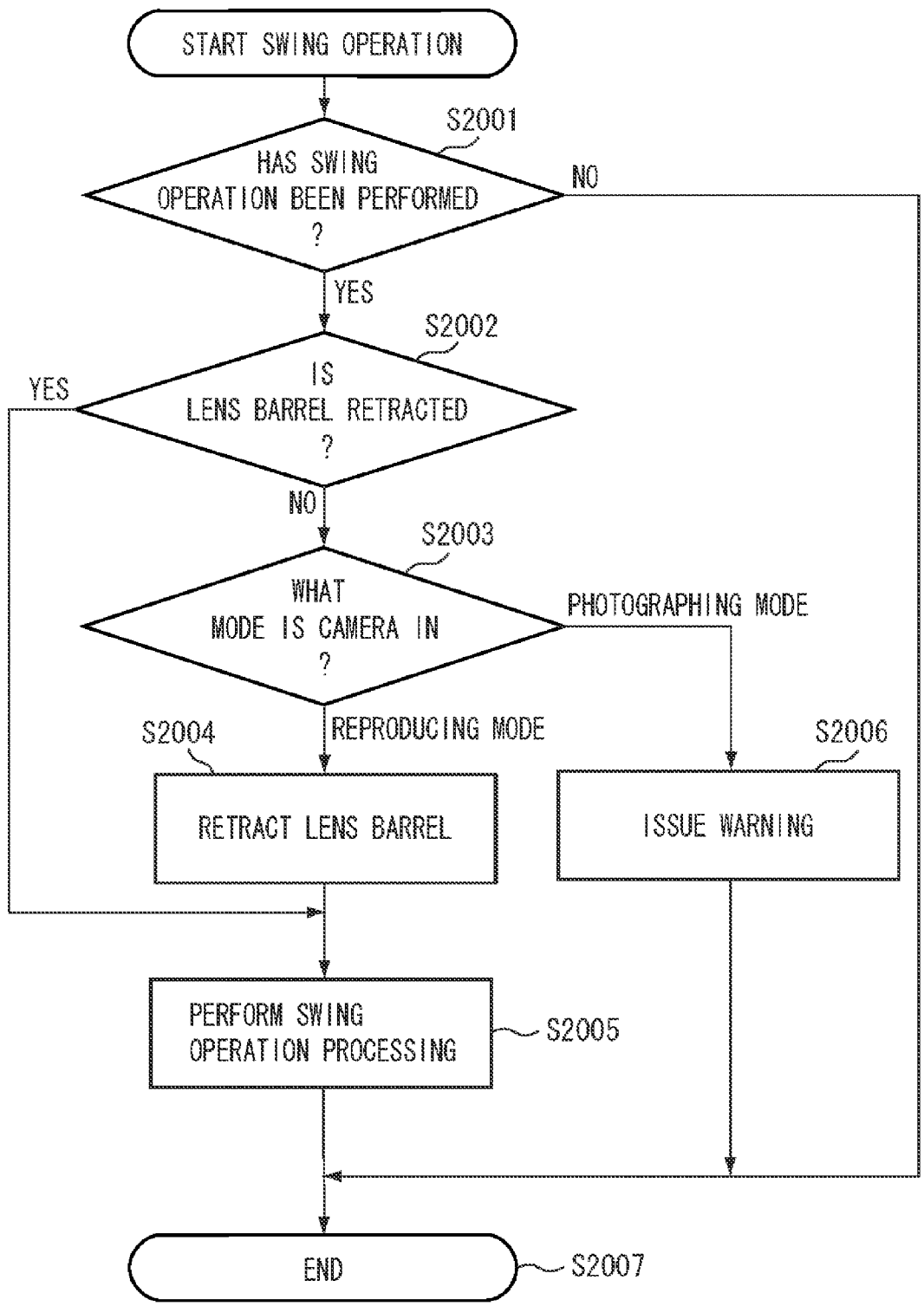
FIG. 7 is a flowchart illustrating an operation example according to a first exemplary embodiment of the present invention.

A swing operation detection processing and a lens-barrel damage prevention processing based on a detection result are described referring to a flowchart in FIG. 7. FIG. 7 is a flowchart illustrating an example of a flow of the lens-barrel damage prevention processing when a swing operation is performed.

The imaging apparatus 101 performs the processing illustrated in FIG. 7 at a timing when a swing operation is detected. For a timing when a swing operation is detected, it may be a timing when the camera system controller 124 detects a state of various switches (the dial switch 131, the pushbutton switch 113, for example).

In step S2001, the camera system controller 124 determines whether the user has done a swing operation. For a detection method for a swing operation, a method can be used which uses acceleration information obtained by the acceleration sensor 130 described above.

If it is determined that a swing operation has not been performed (No in step S2001), the processing proceeds to step S2007, and the processing ends. If it is determined that a swing operation has been performed (Yes in step S2001), the processing proceeds to step S2002, and the camera system controller 124 determines whether the lens barrel 102 is in the extended or retracted state.

If the lens barrel 102 is already retracted (Yes in step S2002), the processing proceeds to step S2005, and the camera system controller 124 executes a detected swing operation processing (processing corresponding to a swing operation) according to a vibration detection signal.

A swing operation processing includes, for example, User Interface (UI) processing corresponding to the operation. In this case, processing previously allocated to the operation is performed. Upon completion of the processing, the processing proceeds to step S2007, and the processing ends.

On the other hand, if it is determined that the lens barrel 102 is extended from the apparatus main body (No in step S2002), the processing proceeds to step S2003, and the camera system controller 124 determines what mode the apparatus is in. If the mode is the photographing mode, the processing proceeds to step S2006.

In step S2006, the lens barrel 102 needs to be extended for image-capturing. However, if the user performs a swing operation when the lens barrel 102 is already extended, there is a danger of breaking the lens barrel. Therefore, a warning is issued to warn the user not to swing the imaging apparatus 101.

With regard to the warning, any measures can be used, such as giving a warning display on the display unit 114 according to an instruction from the camera system controller 124 or outputting a warning sound from a sound output device, such as speaker (not illustrated). After this warning processing, the processing proceeds to step S2007 to end the processing.

If the mode determined in step S2003 is the reproduction mode, the processing proceeds to step S2004. In step S2004, a barrel retraction is performed, in which the lens barrel 102 is retracted into the apparatus main body. Then, the processing proceeds to step S2005, and a swing operation processing is performed. Upon completion of the swing operation processing, the processing proceeds to step S2007. In step S2007, a series of steps are completed.

A second exemplary embodiment of the present invention is described below. A structure of the imaging apparatus of the second exemplary embodiment is similar to the structure described referring to FIGS. 1 to 3 in the first exemplary embodiment. Therefore, the similar method for detecting a swing operation can be used in the second exemplary embodiment, too. To avoid overlap, their detailed descriptions are not repeated.

If a user swings the imaging apparatus when the lens barrel 102 is already extended, the lens barrel 102 may collide with something around the imaging apparatus and get damaged. If the user swings the imaging apparatus with the lens barrel extended, the apparatus does not accept the operation, and can warn the user not to swing the imaging apparatus.

Figure 8:
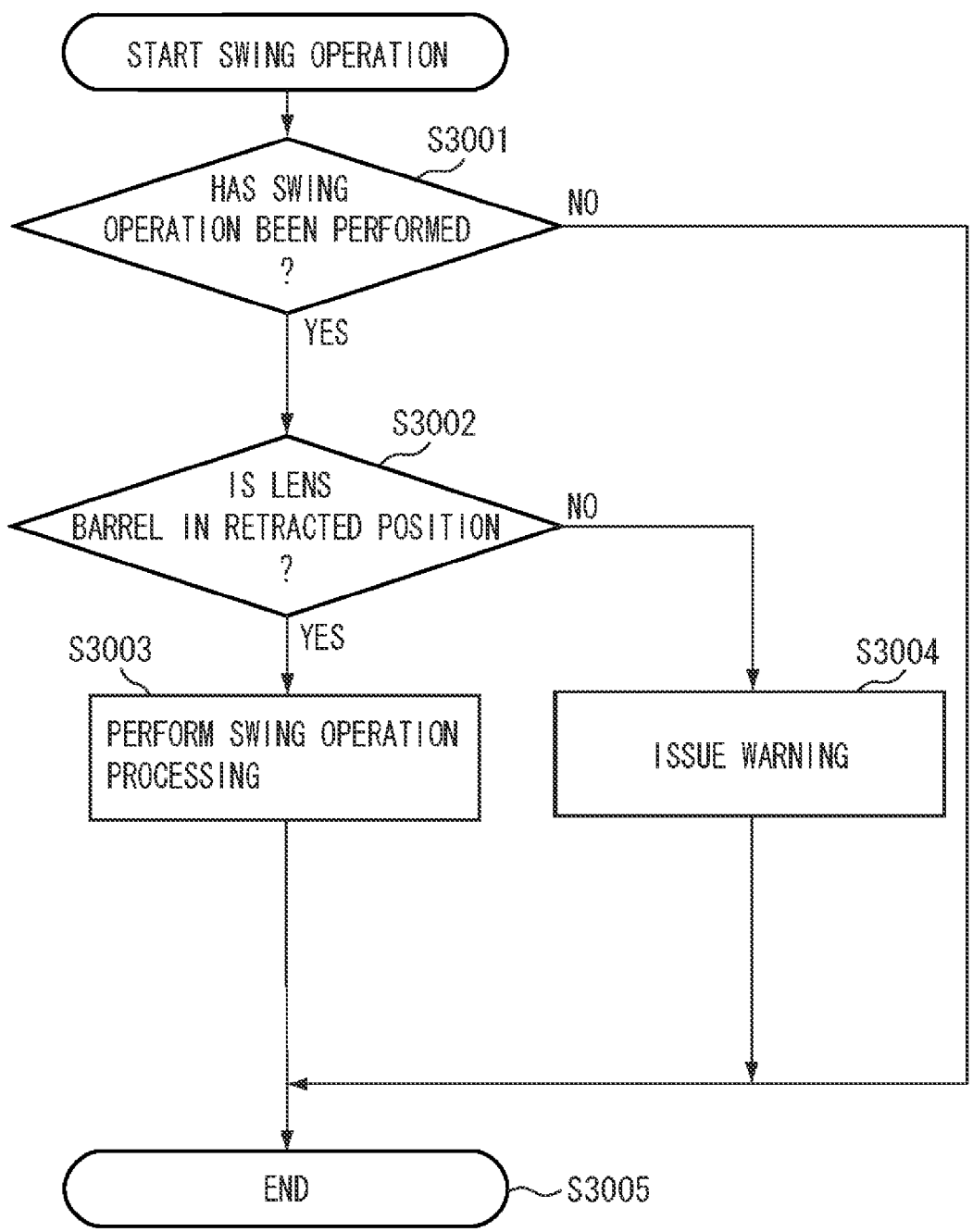
FIG. 8 is a flowchart illustrating an operation example according to a second exemplary embodiment of the present invention.

FIG. 8 is a flowchart of a process that a swing operation when the lens barrel is already extended is not accepted. This process is executed at a timing when a swing operation is detected in the imaging apparatus 101, that is, at a timing when states of the switches are detected in the camera system controller 124.

In step S3001, the camera system controller 124 determines whether the user has performed a swing operation. As a method for detecting a swing operation, the above-described method using the acceleration sensor 130 can be adopted.

If it is determined that a swing operation has not been performed (No in step S3001), the processing proceeds to step S3005, and then the processing is completed. On the other hand, if it is determined that a swing operation has been performed (Yes in step S3001), the processing proceeds to step S3002. In step S3002, the camera system controller 124 determines whether the lens barrel 102 is extended or retracted.

If it is determined that the lens barrel 102 is already retracted (Yes in step S3002), the processing proceeds to step S3003, and a swing operation processing is performed in the similar manner to that described above. At the end of the swing operation processing, the processing proceeds to step S3005, and then a series of steps are completed.

On the other hand, if it is determined that the lens barrel is already extended (No in step S3002), the processing proceeds to step S3004, and then warning is issued to the user. In other words, the user is warned not to swing the apparatus excessively. For this warning, it is useful to give a warning display on the display unit 114 or a sound warning by a sound output device (not illustrated). At the end of a warning processing, the processing proceeds to step S3005, and then a series of steps are completed.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-009976 filed Jan. 20, 2009, which is hereby incorporated by reference herein in its entirety.

What is claimed is:

1. A control apparatus comprising:
a vibration detection unit configured to detect vibration of an apparatus;
a controller configured to perform a predetermined process corresponding to an operation instruction from a user based on a detection signal obtained by the vibration detection unit; and
a driver configured to control drive of a lens barrel,
wherein the controller controls the driver to cause the lens barrel to be withdrawn to a predetermined position when receiving the operation instruction in a mode in which the lens barrel need not be extended, and
wherein the controller does not receive the operation instruction when receiving the operation instruction in a mode in which the lens barrel needs to be extended.

2. The control apparatus according to claim 1, wherein the mode includes a mode for reproducing an image.

3. The control apparatus according to claim 1, wherein the predetermined position where the lens barrel is withdrawn is the position where the lens barrel is retracted into the apparatus main body.

4. A control apparatus comprising:
a vibration detection unit configured to detect vibration of an apparatus; and
a controller configured to perform a predetermined process corresponding to an operation instruction from a user based on a detection signal obtained by the vibration detection unit,
wherein the controller does not receive the operation instruction if the lens barrel is not retracted in a main body of the apparatus.

5. An imaging apparatus including the control apparatus according to claim 1, comprising a sensor configured to capture an object image transmitted through the lens barrel.

6. A control method for an imaging apparatus configured to detect vibration of the imaging apparatus and perform a predetermined process corresponding to an operation instruction from a user based on a detection signal, the control method comprising:
detecting the vibration of the imaging apparatus;
determining whether the vibration is larger than a reference value; and
driving the lens barrel so as to be retracted to a predetermined position when it is determined that the vibration is larger than the reference value in a mode in which the lens barrel need not be extended and not be retracted when the vibration is not larger than the reference value in a mode in which the lens barrel need not be extended.

7. A control method for an imaging apparatus configured to detect vibration of the imaging apparatus and perform a predetermined process corresponding to an operation instruction from a user based on a detection signal, the control method comprising:
detecting the vibration of the imaging apparatus;
determining whether the vibration is larger than a reference value; and
issuing a warning to the user without accepting a determination result that the vibration is larger than the reference value as an operation instruction, when the lens barrel is not in a retracted position in a main body of the imaging apparatus.

* * * * *